3,786,152
SURFACE-COATING COMPOSITIONS CONTAINING N' - TRICHLOROMETHYLMERCAPTO-INDAZOLES
Pasquale P. Minieri, Woodside, N.Y., assignor to Tenneco Chemicals, Inc.
No Drawing. Continuation-in-part of applications Ser. No. 589,235, Oct. 25, 1966, now Patent No. 3,637,736, and Ser. No. 689,812, Dec. 12, 1967, now Patent No. 3,641,050. This application Nov. 6, 1970, Ser. No. 87,615
Int. Cl. A01n 9/22
U.S. Cl. 424—273     14 Claims

ABSTRACT OF THE DISCLOSURE

Compounds that have the structural formula

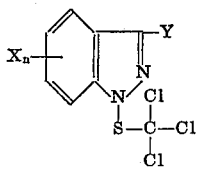

wherein X represents nitro, amino (halogenated benzylidene)amino, or halogen, Y represents hydrogen or halogen, and n is a number in the range of zero to 2 are used to protect surface-coating compositions from deterioration resulting from attack by fungi and other microorganisms.

---

This is a continuation-in-part of my copending application Ser. No. 589,235, which was filed on Oct. 25, 1966 and which is now U.S. Pat. No. 3,637,736, and of my copending application Ser. No. 689,812 which was filed on Dec. 12, 1967 and which is now U.S. Pat. No. 3,641,050.

This invention relates to surface-coating compositions. More particularly, it relates to surface-coating compositions containing N'-trichloromethylmercaptoindazoles that have improved resistance to deterioration resulting from attack by fungi and other microorganisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositons susceptible to mildew. The resulting deterioration of the surface-coating compositions seriously hinders their full scale utilization, particularly in those areas and in those applications that are conducive to such attack. Various biocidal materials have been suggested for use in surface-coating compositions, but none has proven entirely satisfactory in this application. Some do not provide the required prolonged protection against attack by microorganisms, while others undergo sulfide staining, and still others tend to separate from the applied coating by migration, volatilization, or leaching once the coating has been spread in a thin layer over the surface to be protected.

This invention relates to surface-coating compositions that contain a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the color, viscosity, and other physical properties of the surface-coating compositions.

The biocidal compounds that are used in the surface-coating compositions of this invention may be represented by the structural formula

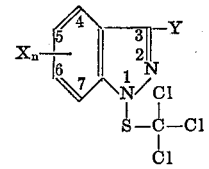

wherein X represents nitro, amino, (chlorobenzylidene) amino, (bromobenzylidene)amino, chlorine, bromnie, or iodine, Y represents hydrogen, chlorine, bromine, fluorine, or iodine, and n is a number in the range of zero to 2. The preferred compounds are those in which n is 1, Y, is hydrogen or chlorine, and X is a nitro group or chlorine atom in the 5- or 6-position.

Illustrative of these compounds are the following:

N'-trichloromethylmercapto-3-chloroindazole,
N'-trichloromethylmercapto-5-nitroindazole,
N'-trichloromethylmercapto-3-chloro-5-nitroindazole,
N'-trichloromethylmercapto-5-chloroindazole,
N'-trichloromethylmercapto-3,5-dichloroindazole,
N'-trichloromethylmercapto-3-bromo-5-aminoindazole,
N'-trichloromethylmercapto-3,5-dibromoindazole,
N'-trichloromethylmercapto-3,5-diiodoindazole,
N'-trichloromethylmercapto-6-nitroindazole,
N'-trichloromethylmercapto-3-bromo-6-aminoindazole,
N'-trichloromethylmercapto-6-(3,4-dichlorobenzylidene) aminoindazole,
N'-trichloromethylmercapto-3-chloro-6-nitroindazole,
N'-trichloromethylmercapto-5,6-dinitroindazole,
N'-trichloromethylmercapto-3,5,6-trichloroindazole, and the like.

The N'-trichloromethylmercaptoindazoles may be prepared by any suitable and convenient procedure. For example, they may be prepared by heating the appropriate substituted indazole with trichloromethylsulfenyl chloride. The reaction is generally carried out in a solvent, such as benzene, toluene, xylene, ethanol, acetone, or ethylene dichloride, at the reflux temperature of the reaction mixture. The preparation and properties of these compounds are described in detail in my copending patent applications Ser. No. 589,235 and Ser. No. 689,812, which is now U.S. Pat. No. 3,641,050.

The biocidal compounds of this invention can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

In a preferred embodiment of this invention, a N'-trichloromethylmercaptoindazole is used as the biocide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more drying oils or bodied drying oils; and alkyd resins, which are resinous products resulting from the reaction of a polyhydric alcohol such as pentaerythritol or glycerol, with a dicarboxylic acid, such as phthalic anhydride, and fatty acids.

In another preferred embodiment of the invention, the substituted indazoles are used in aqueous dispersions that contain about 10 percent to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the biocidal compound need be present in the surface-coating compositions of the present invention. It has been found that as little as 0.10 percent of one or more of these compounds, based on the weight of the composition, will bring about an appreciable improvement in the resistance of the composition to attack by microorganisms. Three percent or more of the biocidal compounds can be used, but these larger amounts generally do not provide further improvement in the properties of the surface-coating compositions and for this reason are not ordinarily used. While the amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended, in most cases about 0.5 percent to 2 percent of the N'-trichloromethylmercaptoindazole, based on the weight of the surface-coating composition, is used.

In addition to the resinous binder and the biocidal compound, the surface-coating compositions of the present invention may contain various auxiliary materials, such as pigments, extenders, solvents, dyes, defoaming agents, driers, emulsifiers, dispersing agents, plasticizers, bactericides, and corrosion inhibitors, in the amounts ordinarily used for these purposes.

The substituted indazole that is used as the biocide may be incorporated into the surface-coating composition by any convenient procedure. For example, it can be combined with the pigments and other components to form a pigment phase that is then mixed with the resinous binder and water or organic solvent to form the surface-coating composition. Alternatively, it can be added to a composition that contains the resinous binder, pigment, and water or organic solvent. The biocidal compound can be added as such to the other components of the surface-coating composition, or it can be added as a soolution of the substituted indazole in, for example, an alcohol, ether or ketone.

The invention is further illustrated by the examples that follow.

EXAMPLE 1

The effectiveness of the N'-trichloromethylmercaptoindazoles in the control of a representative group of fungi, bacteria, and algae was demonstrated by means of the Standard Agar Plate Assay Disc Procedure.

Solutions of the test compounds in dioxane and a solution of phenylmercuric acetate in water were used in the tests.

A summary of the results of the tests is given in Table I. In this table the activity of the compounds against the test organisms is expressed by means of the following symbols:

NZO—No growth inhibition
ZO—Zone of inhibition in mm.
G—Growth in zone

EXAMPLE 2

(A) A polyvinyl acetate emulsion paint was prepared by mixing together the following materials:

| | Parts by wt. |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| Aqueous dispersion solution containing 55% by weight of polyvinyl acetate | 350 |

To samples of this paint was added either 2 percent by weight of one of the biocidal compounds of this invention or 2 percent by weight of a comparative biocide.

(B) An acrylic paint was prepared by mixing together the following materials:

| | Parts by wt. |
|---|---|
| Water | 250 |
| Acrylic acid resin (100% solids) (Acryloid B–66) | 385 |
| Monoethyl ether of ethylene glycol | 259 |
| Titanium dioxide | 143 |
| Aluminum silicate | 45 |
| Magnesium silicate | 98 |

To samples of this paint was added either 2 percent by weight of one of the biocidal compounds of this invention or 2 percent by weight of a comparative biocide.

TABLE I

| | N'-trichloromethylmercapto-5-nitroindazole | | N'-trichloromethylmercapto-6-nitroindazole | | N-trichloromethylmercapto-3-chloro-6-nitroindazole | | PMA-18 [1] | | None |
|---|---|---|---|---|---|---|---|---|---|
| Level tested (percent) | 1.0 | 2.0 | 0.5 | 1.0 | 2.0 | 1.0 | 2.0 | | |
| Fungi (7 days incubation): | | | | | | | | | |
| A. niger | G | G | ZO-4 | ZO-10 | ZO-14 | ZO-11 | ZO-12 | | NZO |
| P. crustosum | ZO-2 | ZO-3 | ZO-11 | ZO-8 | ZO-10 | ZO-10 | ZO-12 | | NZO |
| P. pullulans | NZO | NZO | ZO-11 | ZO-7 | ZO-12 | ZO-17 | Z-021 | | NZO |
| Bacteria (48 hours incubation): | | | | | | | | | |
| E. flavescens | ZO-3 | ZO-7 | ZO-13 | ZO-2 | ZO-2 | ZO-15 | ZO-16 | | NZO |
| S. aureus | NZO | ZO-3 | ZO-6 | | | ZO-15 | ZO-17 | | NZO |
| A. aerogenes | ZO-2 | ZO-6 | ZO-6 | | | ZO-11 | ZO-13 | | NZO |
| X. vesicatoria | | | ZO-6 | | | ZO-10 | | | NZO |
| B. subtilis | | | | ZO-6 | ZO-16 | ZO-22 | ZO-25 | | NZO |
| Algae (7 days incubation) C. vulgaris | ZO-4 | ZO-6 | ZO-3 | ZO-6 | ZO-8 | ZO-20 | | | NZO |

[1] Phenylmercuric acetate.

(C) An exterior house paint was prepared by mixing together the following materials:

| Material | Parts by wt. |
|---|---|
| Basic lead carbonate | 288 |
| Zinc oxide | 232 |
| Titanium dioxide (rutile) | 149 |
| Talc | 260 |
| Linseed oil (alkali refined) | 242 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

To samples of this paint was added 2 percent by weight of either one of the biocidal compounds of this invention or 2 percent by weight of a comparative biocide.

EXAMPLE 3

Samples of the acrylic paint, the polyvinyl acetate paint, and the oil-based paint whose preparation is described in Example 2 were evaluated by the following procedure:

Pieces of drawdown paper were dipped into each of the paints, dried for 24 hours, and again dipped into the paint. After a 24-hour drying period, the coated paper samples were cut into 1¼" squares. Each of the coated paper squares was placed on a plate of malt and mycophil agar, which had been inoculated with 1 ml. of a suspension of the test organism. The plates, prepared in triplicate, were incubated at 28° C. and observed weekly. The results obtained are summarized in Table II. In this table ZO indicates zone of inhibition in mm.

EXAMPLE 4

Samples of the acrylic paint, the polyvinyl acetate paint, and the oil-based paint whose preparation was described in Example 2 were evaluated by the following procedure: Pieces of drawdown paper were dipped into each of the paints, dried for 24 hours, and again dipped into the paint. After a 24-hour drying period, one of the samples coated with each of the treated paints was leached for 24 hours in accordance with Method 5831, CCC-T-191b. The coated paper samples were cut in 1¼" squares. Each of the coated paper squares are placed on a plate of malt and mycophil agar, which had been inoculated with 1 ml. of a suspension of the test organism. The plates, prepared in triplicates, were incubated at 28° C. and observed weekly. The growth was estimated according to the following key, and the results of the triplicate plates were averaged. In Table III:

TABLE III

| | Biocide | | | | | | | |
|---|---|---|---|---|---|---|---|---|
| | N'-trichloromethylmercapto-6-nitroindazole | | N'-trichloromethylmercapto-3-chloro-5-nitroindazole | | Bis(phenylmercuric) dodecenyl succinate (Super Ad-It) | | None | |
| Paint | Acrylic | Oil | Acrylic | Oil | Acrylic | Oil | Acrylic | Oil |
| Fungicidal activity; *Aspergillus niger*: | | | | | | | | |
| Unleached:[1] | | | | | | | | |
| 1 week | 0 | ZO-1 | ZO-1 | 0 | ZO-6 | ZO-5 | 10 | 10 |
| 2 weeks | 0 | ZO-1 | ZO-1 | 0 | ZO-6 | ZO-5 | 10 | 10 |
| 3 weeks | 0 | ZO-1 | 0 | 0 | ZO-4 | ZO-5 | 10 | 10 |
| 4 weeks | 0 | ZO-1 | 0 | 0 | ZO-2 | ZO-5 | 10 | 10 |
| Leached:[1] | | | | | | | | |
| 1 week | 0 | 0 | 0 | 0 | ZO-3 | ZO-5 | 10 | 10 |
| 2 weeks | 0 | 0 | 0 | 0 | ZO-3 | ZO-5 | 10 | 10 |
| 3 weeks | 0 | 0 | 0 | 0 | ZO-3 | ZO-5 | 10 | 10 |
| 4 weeks | 0 | 0 | 0 | 0 | ZO-3 | ZO-5 | 10 | 10 |
| *Pullularia pullulans*: | | | | | | | | |
| Unleached:[1] | | | | | | | | |
| 1 week | 0 | ZO-1 | ZO-1 | 0 | 1 | 0 | 10 | 10 |
| 2 weeks | 0 | ZO-1 | ZO-1 | 0 | 1 | 0 | 10 | 10 |
| 3 weeks | 0 | ZO-1 | ZO-1 | 0 | 1 | 1 | 10 | 10 |
| 4 weeks | 0 | ZO-1 | ZO-1 | 0 | 2 | 1 | 10 | 10 |
| Leached:[1] | | | | | | | | |
| 1 week | 0 | 0 | 0 | 0 | 0 | 0 | 10 | 10 |
| 2 weeks | 0 | 0 | 0 | 0 | 0 | 1 | 10 | 10 |
| 3 weeks | 0 | 0 | 0 | 0 | 1 | 1 | 10 | 10 |
| 4 weeks | 0 | 0 | 0 | 0 | 2 | 1 | 10 | 10 |

[1] Number of weeks at 28° C. and 90–95% relative humidity.

ZO=Zone of inhibition in mm.
0=No zone of inhibition; no growth on paint film
1–10=Increasing amounts of growth on paint film

EXAMPLE 5

Samples of the polyvinyl acetate emulsion paint described in Example 2 that contained either 2 percent by weight of N'-trichloromethylmercapto-6-nitroindazole or a comparative fungicide or no fungicide were applied to cedar panels, and the painted panels were exposed on a test fence in Florida. The panels were observed at frequent intervals, and the amount of fungal growth on them was recorded using a scale of 0–10 in which 0 indicated no growth and 10 indicated that the panel was

TABLE II

| Biocide | Paint | pH | Effect on color of paint | Fungicidal activity | | |
|---|---|---|---|---|---|---|
| | | | | *Pullularia pullulans* | *Penicillium crustosum* | *Aspergillus niger* |
| N'-trichloromethylmercapto-3-chloroindazole | Acrylic | 7.2 | None | ZO-3 | ZO-2 | ZO-3 |
| | PVA | 6.5 | do | ZO-3 | ZO-2 | ZO-3 |
| | Oil | | do | ZO-2 | ZO-2 | ZO-3 |
| N'-trichloromethylmercapto-3-chloro-5-nitroindazole | Acrylic | 8.5 | Off-white | ZO-5 | ZO-2 | ZO-2 |
| | PVA | 7.0 | do | ZO-4 | ZO-3 | ZO-2 |
| | Oil | | None | ZO-6 | ZO-3 | ZO-1 |
| N'-trichloromethylmercapto-3,5-dichloroindazole | Acrylic | 8.1 | do | ZO-1 | | |
| | PVA | 6.9 | do | ZO-2 | | |
| | Oil | | do | ZO-1 | | |
| N'-trichloromethylmercapto-6-nitroindazole | Acrylic | 8.0 | do | ZO-3 | ZO-2 | ZO-3 |
| | PVA | 7.1 | do | ZO-8 | ZO-7 | ZO-5 |
| | Oil | | do | ZO-5 | ZO-5 | ZO-5 |
| N'-trichloromethylmercapto-6-(3,4-dichlorobenzylidene) amino indazole | Acrylic | 8.3 | do | ZO-1 | | |
| | PVA | 6.8 | do | ZO-1 | | |
| | Oil | | do | ZO-1 | | |
| Bis-(phenylmercuric)dodecenylsuccinate (Super Ad-It) | Acrylic | 8.4 | do | ZO-9 | ZO-1 | ZO-10 |
| | PVA | 6.9 | do | ZO-17 | ZO-6 | ZO-13 |
| | Oil | | do | ZO-8 | ZO-4 | ZO-10 | covered with fungal growth. The results obtained are summarized in Table IV.

TABLE IV

| Number of months panels were exposed— | N'-tri-chloromethyl-mercapto-6-nitro-indazole | Bis-(phenyl-mercuric) dodecenyl succinate | None |
| --- | --- | --- | --- |
| 5 | 0 | 0 | 4 |
| 7 | 0 | 2 | 6 |
| 9 | 2 | 2 | 6 |
| 11 | 2 | 2 | 8 |
| 13 | 2 | 2 | 8 |
| 15 | 2 | 2 | 8 |
| 17 | 2 | 4 | 8 |
| 19 | 2 | 4 | 8 |
| 21 | 2 | 4 | 8 |
| 24 | 4 | 4 | 8 |

From the data in the foregoing tables it will be seen that the N'-trichloromethylmercaptoindazoles are effective biocides for both water-based and oil-based paints. They impart to these paints resistance to attack by microorganisms that is maintained even after leaching. They do not affect the pH, color, viscosity, or heat aging characteristics of the paints. Unlike those containing bis-(phenylmercuric) dodecenylsuccinate as the biocide, the paint films that contain the N'-trichloromethylmercaptoindazoles do not undergo gray or black staining when they are exposed to hydrogen sulfide.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:

1. A surface-coating composition that comprises from about 0.10 percent to 3 percent, based on the weight of said composition, of a fungicidal compound having the structural formula

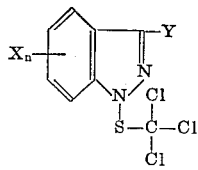

wherein X represents nitro, amino, (halobenzylidene) amino, or halogen; Y represents hydrogen or halogen; and $n$ represents a number in the range of zero to two and a water-insoluble resinous binder selected from the group consisting of drying oils, oleoresinous varnishes, alkyd resins, polyvinyl acetate, polyvinyl butyrate, polyvinyl chloride, copolymers of vinyl acetate with vinyl chloride or acrylonitrile, copolymers of vinyl chloride with acrylonitrile or vinylidene chloride, polyethylene, polyisobutylene, polystyrene, copolymers of styrene with butadiene, copolymers of acrylonitrile with butadiene, copolymers of methacrylic and acrylic acid esters of alcohols having one to eight carbon atoms with vinyl acetate, vinyl chloride, acrylonitrile, or styrene, and copolymers of styrene with maleic anhydride.

2. The surface-coating composition as set forth in claim 1 that contains 0.5 percent to 2 percent, based on the weight of said composition, of N'-trichloromethylmercapto-5-nitroindazole.

3. The surface-coating composition as set forth in claim 1 that contains 0.5 percent to 2 percent, based on the weight of said composition, of N'-trichloromethylmercapto-6-nitroindazole.

4. The surface-coating composition as set forth in claim 1 that contains 0.5 percent to 2 percent, based on the weight of said composition, of N'-trichloromethylmercapto-3-chloro-6-nitroindazole.

5. The surface-coating composition as set forth in claim 1 that contains 0.5 percent to 2 percent, based on the weight of said composition, of N'-trichloromethylmercapto-3-chloro-5-nitroindazole.

6. The surface-coating composition as set forth in claim 1 that contains 0.5 percent to 2 percent, based on the weight of said composition, of N'-trichloromethylmercapto-3,5-dichloroindazole.

7. The surface-coating composition as set forth in claim 1 that contains 0.5 percent to 2 percent, based on the weight of said composition, of N'-trichloromethylmercapto-3-chloroindazole.

8. The surface-coating composition as set forth in claim 1 wherein the resinous binder is polyvinyl acetate.

9. The method of controlling the growth of fungi in a surface-coating composition that contains a water-insoluble resinous binder selected from the group consisting of drying oils, oleoresinous varnishes, alkyd resins, polyvinyl acetate, polyvinyl butyrate, polyvinyl chloride, copolymers of vinyl acetate with vinyl chloride or acrylonitrile, copolymers of vinyl chloride with acrylonitrile or vinylidene chloride, polyethylene, polyisobutylene, polystyrene, copolymers of styrene with butadiene, copolymers of acrylonitrile with butadiene, copolymers of methacrylic and acrylic acid esters of alcohols having one to eight carbon atoms with vinyl acetate, vinyl chloride, acrylonitrile, or styrene, and copolymers of styrene with maleic anhydride that comprises incorporating in said composition a fungicidally effective amount of from about 0.10 percent to 3 percent, based on the weight of the composition, of a compound having the structural formula

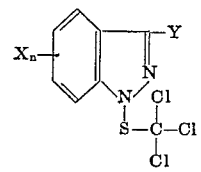

wherein X represents nitro, amino, (halobenzylidene) amino, or halogen; Y represents hydrogen or halogen; and $n$ represents a number in the range of zero to two.

10. The method of claim 9 wherein 0.5 percent to 2 percent, based on the weight of the composition, of N'-trichloromethylmercapto-6-nitroindazole is incorporated into the composition.

11. The method of claim 9 wherein 0.5 percent to 2 percent, based on the weight of the composition, of N'-trichloromethylmercapto-5-nitroindazole is incorporated into the composition.

12. The method of claim 9 wherein 0.5 percent to 2 percent, based on the weight of the composition, of N'-trichloromethylmercapto-3-chloro-6-nitroindazole is incorporated into the composition.

13. The method of claim 9 wherein 0.5 percent to 2 percent, based on the weight of the composition, of N'-trichloromethylmercapto-3-chloro-5-nitroindazole is incorporated into the composition.

14. The method of claim 9 wherein 0.5 percent to 2 percent, based on the weight of the composition, of N'-trichloromethylmercapto-3,5-dichloroindazole is incorporated into the composition.

References Cited

UNITED STATES PATENTS

| 3,641,050 | 2/1972 | Minieri | 424—273 |
| 3,637,736 | 1/1972 | Minieri | 260—310 C |

ALBERT T. MEYERS, Primary Examiner

V. D. TURNER, Assistant Examiner

U.S. Cl. X.R.

106—15 AF; 260—310, 45.8 N